United States Patent [19]

Copenhaver, Sr.

[11] Patent Number: 4,769,942
[45] Date of Patent: Sep. 13, 1988

[54] PRE-SET, PRE-BAITED, DISPOSABLE ANIMAL TRAP

[76] Inventor: Richard W. Copenhaver, Sr., Rte. #1, Box 140-1, Kansas, Okla. 74347

[21] Appl. No.: 57,306

[22] Filed: Jun. 4, 1987

[51] Int. Cl.$^4$ ............................................. A01M 23/20
[52] U.S. Cl. .............................................. 43/61; 43/58
[58] Field of Search ....................................... 43/61, 58

[56] References Cited

U.S. PATENT DOCUMENTS

| 11,942 | 11/1854 | Myers . | |
|---|---|---|---|
| 107,647 | 9/1870 | Bachman | 43/61 |
| 253,907 | 2/1882 | Andre | 43/61 |
| 425,136 | 4/1890 | Latta | 43/67 |
| 451,163 | 4/1891 | Skinner | 43/61 |
| 1,024,278 | 4/1912 | Niederlitz | 43/61 |
| 2,160,809 | 6/1936 | Burnley | 43/67 |
| 4,127,958 | 12/1978 | Peters | 43/81 |
| 4,158,929 | 6/1979 | Custard | 43/58 |
| 4,231,180 | 11/1980 | Bare | 43/61 |
| 4,425,731 | 1/1984 | Orlando | 43/58 |
| 4,583,317 | 4/1986 | Beard | 43/61 |

Primary Examiner—Nicholas P. Godici
Assistant Examiner—Carmine Cuda
Attorney, Agent, or Firm—Ronald P. Kananen

[57] ABSTRACT

A trap for small animals, such as mice, includes a suitable housing having an access opening for an animal. The trap is pre-baited and pre-set for ease and convenience in use, and is disposable and non-reusable. An opening for access to the interior of the trap is initially covered by a removable adhesive strip or other covering approximate to the size of the trap. The housing includes a spring-biased slidable member secured in a set position by a chewable member. When the animal chews through the chewable member to reach the bait, the biased door is released to cover the opening to trap the animal inside.

11 Claims, 1 Drawing Sheet

PRE-SET, PRE-BAITED, DISPOSABLE ANIMAL TRAP

BACKGROUND OF THE INVENTION

This invention relates to a disposable, pre-set, pre-baited, animal trap. More particularly, this invention relates to an animal trap which is sold in a pre-set position with bait in the trap so that an animal accessing the bait releases a biased slidable member to trap the animal within the trap. More particularly, this invention relates to an animal trap of the type described which is disposable as a unit after use.

Animal traps, and in particular those intended for mice and rats, are known to the art. A well-known example is a mousetrap having a spring-biased lever arm which is released from a set to a closed position when the animal depresses a plate supporting a bait to release the arm to kill the rodent. Such an approach is inconvenient in that, while the trap is reusable, it requires baiting by its user and disposal of the expired mouse.

U.S Pat. No. 4,127,958 is an example of a mousetrap having a telescoping housing member movable between a set position and a closed position. Actuation of a trigger mechanism by the mouse delivers a killing blow to the mouse while causing the housing members to be moved to their closed position to enclose the mouse after killing. Such a device is convenient for disposing of the dead animal.

Another example of a disposable animal trap is shown in U.S. Pat. No. 4,231,180 which similarly includes slidable interfitting plastic members biased axially toward each other to close an animal entrance in the trap to entrap the animal within the interior of the trap. Within the trap, the animal releases a detent member by depressing a trigger plate housing a bait.

Despite these and a number of other approaches in this art, a convenient pre-baited, pre-set, disposable trap is sought in the marketplace to facilitate ease of use by a squeamish consumer.

Accordingly, it is an overall objective of this invention to provide a pre-set, pre-baited, disposable mousetrap.

It is an additional object of this invention to provide a convenient, easy to use mousetrap having a slidable member to seal an opening to entrap an animal therein.

It is an additional object of this invention to provide a trap having an axially slidable member which is moved from its set to its trap position by an animal chewing a chewable member to release a retaining member securing the slidable member in its set position.

These and other objects of the invention will become apparent from the following detailed description of the invention taken in conjunction with the accompaying drawings.

SUMMARY OF THE INVENTION

Directed to achieving the foregoing objects and overcoming problems in the prior art, this invention relates to a trap for the live entrapment of small animals, such as mice, and their subsequent extermination.

The trap includes an elongated housing having at least one wall defining an opening sized for entry of a small animal. A slidable member is located adjacent an interior wall of the opening-defining surface and is capable of being positioned in a first position which is free from the opening and in a second position which seals the opening against exit of the small animal from the trap.

Means are provided for biasing the slidable member in the set position toward the trap position.

Means are also provided for retaining the slidable member in the set position. The retaining means cooperate with the bait within the trap so that eating activity of the small animal releases the retaining means to cause the slidable member to axially move from the set position to the trap position.

The trap according to the invention is provided to its user in a pre-set, pre-baited state, so that its use is convenient. The user merely needs to remove an adhesive covering from the opening in a wall of the trap and place the trap at a desired location. Moreover, the trap is easily disposable and primarily intended for a single use. Since the animal is trapped within the housing and suffocates therein, both the trap and the animal are discarded, thus avoiding handling of the carcass of the animal.

A method for using this invention are disclosed, as are alternatives to the preferred embodiment.

DETAILED DESCRIPTION OF THE PREFERRED EMBODIMENT

Figure 1:
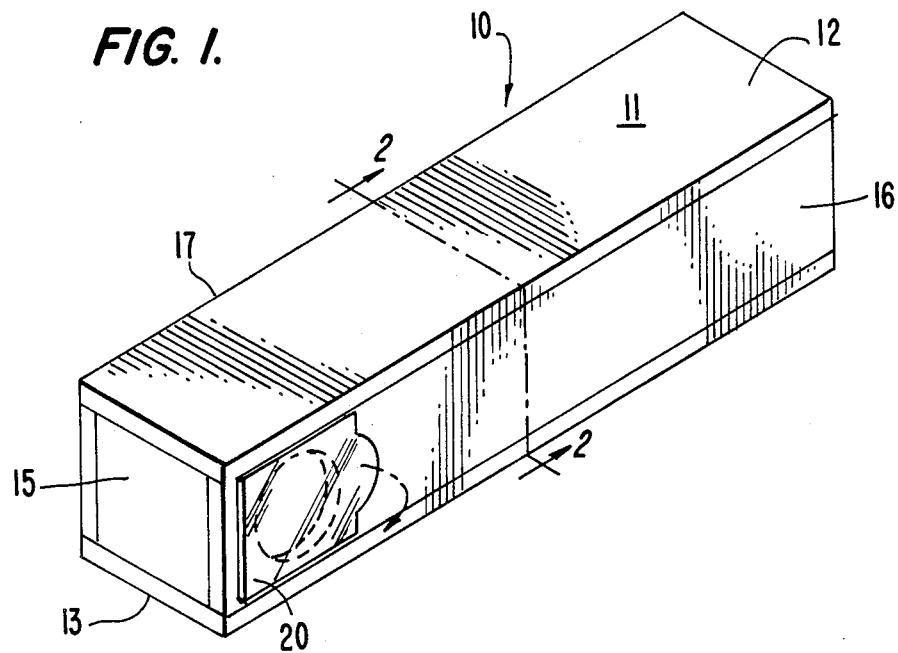
FIG. 1 is a top perspective view of the disposable mousetrap according to the invention shown in its set position with an animal access opening sealed.

In FIG. 1, a disposable mousetrap which is prebaited and pre-set to trap an animal, for example a rodent such as a common house or field mouse, is shown generally by the reference numeral 10. The trap 10 is formed from a molded plastic casing 11 having a top surface 12, a bottom surface 13, a right side wall 14, a left side wall 15, a front wall 16, and a rear wall 17 which together define an elongated, substantially closed structure. The trap 10 may be clear to permit a view of the interior of the trap 10 to determine whether a mouse has been trapped therein. However, the plastic may also be colored or opaque to conceal the trapped animal from the view of the user. The trap 10 may assume other shapes and forms as well, within the teachings of this invention.

It is a feature of the invention that the trap 10 is safe, nontoxic, harmless to persons, and is non-reusable and totally disposable. Thus, the trap 10 is simple to use in that it is sold to the consumer in a fashion which is prebaited and pre-set, as shown in FIG. 1 and is ready for immediate use with a minimum preparatory step.

The front wall 16 defines an animal entry opening 18 which when sold is covered with an easily-removable, peel-off adhesive member 20 covering the opening 18. The opening 18 is sized to accommodate the entry of the animal, such as a rodent, to the interior of the trap 10 through an attraction of bait and/or bait odor within the trap 10. For a common field mouse, the trap 10 may be approximately 6 inches long and 1½ inches square. When sold, the entire trap 10 is ready to be used immediately upon the removal of the peel off adhesive 20 to expose the opening 10 to the entry of a rodent without any additional baiting or trap-setting steps by its user. Thus, an attractive feature of the trap 10 is that it is sold in a ready-to-use fashion without requiring the consumer to bait and set the trap. The adhesive cover 20 may also assume a form appropriate to the size of the trap. The adhesive cover 20 keeps the bait fresh between manufacture and use, while keeping store mice, dirt, and insects out of the trap while in stock or storage.

Figure 2:
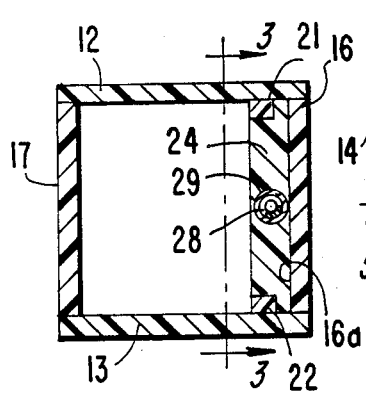
FIG. 2 is a cross-sectional view taken along line 2—2 of FIG. 1.
Figure 3:
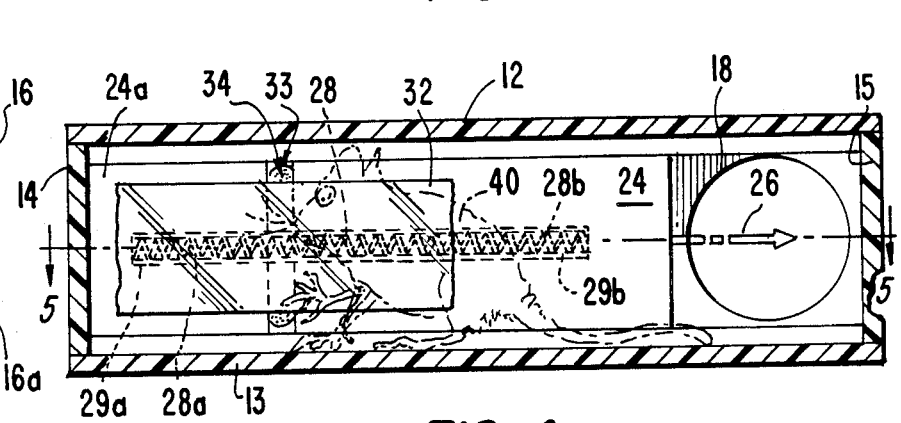
FIG. 3 is a side cross-sectional view taken along line 3—3 of FIG. 2 showing the bait in its secured position with the trap set.
Figure 4:
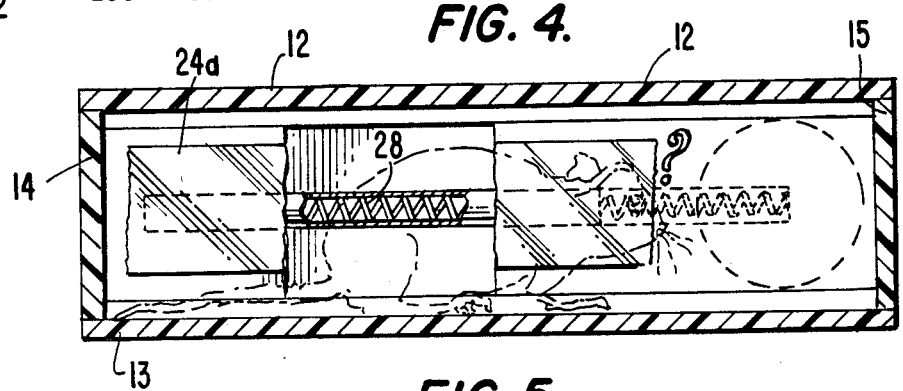
FIG. 4 is a side cross-sectional view similar to FIG. 3 showing the slidable door closing the rodent opening under the influence of a compression spring.
Figure 5:
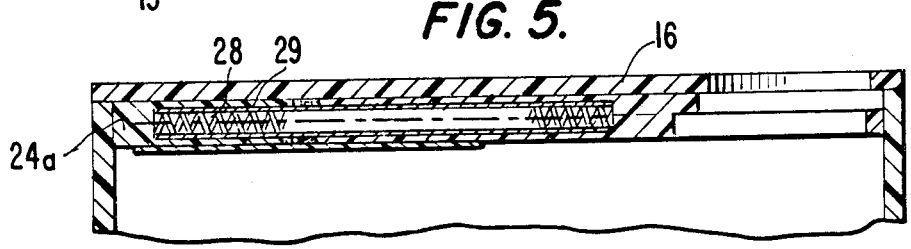
FIG. 5 is a cross-sectional view taken along line 5—5 of FIG. 3 showing the compression spring located within the slidable door.

As best seen in FIG. 2, the front wall 16 defines relative to its interior surface 16a upper and lower guide rails 21 and 22 to permit an axially-slidable, spring-loaded slidable door 24 to translate axially along the inner surface 16a. As seen in FIG. 3, the slidable door 24, when the trap 10 is in its set position, is free from interference with the opening 18. When released, the door 24 is axially slidable in a direction designated by the arrow 26 to the closed, or trap position shown in FIG. 4 under the influence of a compression spring 28. Preferably, the compression spring 28 is located in a bore 29 located within the door 24 at about its axial mid-point.

As best seen in FIG. 3, the trap 10 includes a base block 24a having a bore 29a for receiving an end 28a on the spring 28. The block 24a is fixed relative to the end wall 15 of the trap 10 to provide a reference point for loading the spring. The bore 29a in the block 24a is in register with the bore 29b in the slidable door 24 for receiving the other end 28b of the spring 28 therein. Thus, the door 24 is slidable between limits defined by the base block 24a and the right side wall 15.

During manufacture, the trap 10 is set to permit access to the opening 18 by securing adhesive tape 32 in a location spanning the base block 24a and the movable door 24. The respective transverse ends of the door 24 and the base block 24a together define a transverse groove 33 therebetween for receiving therein a bait 34 prior to securing the adhesive tape 32 thereon. The bait is located within the groove 33 so that at least a portion thereof transversely extends beyond the axially extending surfaces of the tape to assure attraction of the rodent and to create a bait odor within the trap 10.

In practice, the rodent, shown in phantom by the reference numeral 40, chews the tape 32 at the location of the groove 34 to reach the bait 33 located behind the tape. In doing so, the tape 32 is effectively transversely fractured to release the movable door 24 which, under the bias of the spring 28 is projected in the direction of the arrow 26 to seal the opening 18 and trap the rodent 40 within the trap 10. The slidable relationship between the door 24 and the opening 18 is such that, not only is the rodent 40 unable to escape, but also it suffocates within the trap. The trap 10 may thus be disposed of with the rodent 40 inside and is not intended to be reusable in practice.

As a preferred embodiment, suitable for use for field mice, the trap 10 is made from molded plastic approximately ⅛ inch thick with a ¼ inch thick sliding door. The front wall 16 is preferably molded so that the base block 24a is integral with the front wall 16. The compression spring 29 is preferably made of steel approximately 5/32 inches in diameter and 4⅜ inches long. The bait 34 is preferably peanut butter, the tape 32 is preferably cellophane-type tape, and the label 20 is preferably a peel off adhesive tape. The diameter of the opening 18 is approximately 1 inch and the trap has overall dimensions of 6 inches by 1½ inches.

The bait may assume alternative forms as well. For example, a bait may be prepared with a consistencey (similar to a dog biscuit) which is sufficient to retain the door in its set position without need for the adhesive tape. The bait, when chewed by the animal, will then fracture or lose its retaining strength, thus releasing the door as described.

It is a significant advantage of the trap 10 according to the invention that it is set during the manufacturing process with the door held in the open position by the action of the tape. Thus, the trap is not only disposable, but is pre-baited and pre-set for ease of use and convenience to the consumer, and is thus particularly attractive to the squeamish consumer.

What is claimed is:

1. A trap for the live entrapment of animals, such as mice, comprising:

an elongated housing having a wall defining an opening therein, sized for entry of a small animal;

a slidable member located within said housing, adjacent an interior surface of said openingdefining wall and capable of being positioned in a first position which is free from said opening and in a second position sealing said opening in a substantially air tight manner and against exit of said small animal from said trap;

means for biasing said slidable member in said first position toward said second position; and means for retaining said slidable member in said first position, said retaining means cooperating with bait within said trap so that eating activity of said animal on said retaining means to reach said bait releases said retaining means to cause said slidable member to be released to axially move from said set position to said trap position.

2. The trap as set forth in claim 1, wherein said housing is a generally elongated shape defined by a plurality of walls, at least one of said walls having said opening therein.

3. The trap as set forth in claim 2, further including removable adhesive means for sealing said opening, said adhesive means being readily removable to prepare said trap for immediate use.

4. The trap as set forth in claim 3, wherein said opening-defining wall defines a guide rail adjacent each of an upper and lower surface in said trap, said slidable member cooperating with said guide rails to be axially slidable to and fro within the interior of said trap to cover and uncover said opening.

5. The trap as set forth in claim 4, wherein said biasing means is a compression spring located in a bore in said slidable member.

6. The trap as set forth in claim 5, wherein said opening-defining wall further includes a block member having a bore therein in register with the bore on said slidable member, said compression spring being located in each bore.

7. The trap as set forth in claim 6, wherein, said retaining means is a chewable member spanning said block and said slidable member and covering bait disposed in a groove located therebetween, the action of said animal in reaching said bait in said groove releasing said chewable member to cause said slidable member to be released from the set position to the trap position to seal said opening.

8. The trap as set forth in claim 7, wherein said releasable member includes a piece of cellophane tape securing said slidable member in said set position to said block member.

9. A trap for the live entrapment of animals, such as mice, comprising:
- a generally elongated housing having a plurality of walls, at least one of said walls defining an opening therein, sized for entry of a small animal;
- a slidable member located adjacent an interior surface of said opening-defining wall and capable of being positioned in a first position which is free from said opening and in a second position sealing said opening against exit of said small animal from said trap, said opening-defining wall defining a guide rail adjacent each of an upper and lower surface in said trap, said slidable member cooperating with said guide rails to be axially slidable to and fro within the interior of said trap to cover and uncover said opening;
- means for biasing said slidable member in said first position toward said second position, said biasing means comprising a compression spring located in a bore in said slidable member, said openingdefining wall further including a block member having a bore therein in register with the bore on said slidable member, said compression spring being located in each bore;
- means for retaining said slidable member in said first position, said retaining means cooperating with bait within said trap so that eating activity of said animal on said retaining means to reach said bait releases said retaining means to cause said slidable member to be released to axially move from said first position to said second position; and
- removable adhesive means for sealing said opening, said adhesive means being readily removable to prepare said trap for immediate use.

10. The trap as set forth in claim 9, wherein said retaining means is a chewable member spanning said block and said slidable member and covering bait disposed in a groove located therebetween, the action of said animal in reaching said bait in said groove releasing said chewable member to cause said slidable member to be released from the first position to the second position to seal said opening.

11. The trap as set forth in claim 10, wherein said releasable member includes a piece of cellophane tape securing said slidable member in said first position to said block member.

* * * * *

UNITED STATES PATENT AND TRADEMARK OFFICE
CERTIFICATE OF CORRECTION

PATENT NO. : 4,769,942

DATED : September 13, 1988

INVENTOR(S) : Richard W. Copenhaver, Sr.

It is certified that error appears in the above-identified patent and that said Letters Patent is hereby corrected as shown below:

Column 4, line 24, "openingdefining" should read -- opening-defining --;

Signed and Sealed this

Twenty-fourth Day of January, 1989

Attest:

DONALD J. QUIGG

Attesting Officer

Commissioner of Patents and Trademarks